US012760801B2

(12) United States Patent
Kawai et al.

(10) Patent No.: US 12,760,801 B2
(45) Date of Patent: Oct. 13, 2026

(54) FLUID CONTROL VALVE AND FLUID CONTROL DEVICE

(71) Applicant: HORIBA STEC, Co., Ltd., Kyoto (JP)

(72) Inventors: Yuya Kawai, Kyoto (JP); Atsushi Ieki, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 36 days.

(21) Appl. No.: 18/923,513

(22) Filed: Oct. 22, 2024

(65) Prior Publication Data

US 2025/0129856 A1 Apr. 24, 2025

(30) Foreign Application Priority Data

Oct. 23, 2023 (JP) ................................ 2023-181923

(51) Int. Cl.

| | |
|---|---|
| ***F16K 7/12*** | (2006.01) |
| ***F16K 37/00*** | (2006.01) |
| *F16K 1/14* | (2006.01) |
| *F16K 1/32* | (2006.01) |
| *F16K 1/36* | (2006.01) |
| *F16K 7/14* | (2006.01) |
| *F16K 25/00* | (2006.01) |
| *F16K 31/00* | (2006.01) |
| *G05D 7/06* | (2006.01) |

(52) U.S. Cl.

CPC ............ *F16K 7/12* (2013.01); *F16K 37/0091* (2013.01); *F16K 1/14* (2013.01); *F16K 1/32* (2013.01); *F16K 1/36* (2013.01); *F16K 7/14* (2013.01); *F16K 25/005* (2013.01); *F16K 31/004* (2013.01); *F16K 31/007* (2013.01); *F16K 37/005* (2013.01); *G05D 7/06* (2013.01)

(58) Field of Classification Search

CPC .......... F16K 7/12; F16K 7/14; F16K 37/0091; F16K 37/005; F16K 25/005; F16K 31/007; F16K 31/004; F16K 1/32; F16K 1/36; F16K 1/14; G05D 7/06

USPC .......................................................... 251/331

See application file for complete search history.

(56) References Cited

U.S. PATENT DOCUMENTS

| | | | | |
|---|---|---|---|---|
| 4,771,204 | A * | 9/1988 | Siegal | F16K 31/006 310/330 |
| 10,619,744 | B2 * | 4/2020 | Glime, III | F16K 1/12 |
| 11,982,371 | B2 * | 5/2024 | Shakudo | F16K 11/04 |
| 2001/0025941 | A1 * | 10/2001 | Smith, Jr. | F16K 25/005 251/315.04 |
| 2006/0208214 | A1 * | 9/2006 | Okada | F16K 25/005 251/368 |

(Continued)

FOREIGN PATENT DOCUMENTS

JP 6141663 B 6/2017

*Primary Examiner* — Minh Q Le

(74) *Attorney, Agent, or Firm* — Alleman Hall LLP

(57) ABSTRACT

In order to configure a fluid control valve to have the life prolonged while keeping an inexpensive configuration, the fluid control valve includes: a valve body that can come into contact and separate from a valve seat; an actuator that causes the valve body to move; a diaphragm member provided between the valve body and the actuator and having a protruding part protruding toward the valve body; and a sphere housed inside the protruding part, in which the actuator moves the valve body by pressing a distal end of the protruding part through the sphere, and the sphere is formed of a ceramic material.

5 Claims, 5 Drawing Sheets

(56) References Cited

U.S. PATENT DOCUMENTS

| | | | | |
|---|---|---|---|---|
| 2011/0094954 | A1* | 4/2011 | Wagner | F16K 1/42 251/318 |
| 2014/0290778 | A1* | 10/2014 | Yasuda | F16K 31/007 137/859 |
| 2014/0374634 | A1* | 12/2014 | Ohtsuki | G05D 7/0635 700/282 |
| 2016/0296990 | A1* | 10/2016 | Muramoto | B21D 22/10 |
| 2022/0163983 | A1* | 5/2022 | Shakudo | G05B 11/36 |
| 2024/0240726 | A1* | 7/2024 | Glime, III | F16K 27/0281 |

* cited by examiner

FLUID CONTROL VALVE AND FLUID CONTROL DEVICE

CROSS-REFERENCE TO RELATED APPLICATION

The present application claims priority to Japanese Patent Application No. 2023-181923 filed Oct. 23, 2023, entitled "FLUID CONTROL VALVE AND FLUID CONTROL DEVICE" which is incorporated herein by reference in its entirety.

BACKGROUND OF THE INVENTION

Technical Field

The present invention relates to a fluid control valve and a fluid control device.

Description of the Related Art

As described in JP 6141663 B2, as a conventional fluid control valve, one in which pressing force generated by an actuator is transmitted to a valve body by a diaphragm member has been conceived.

Specifically, in this fluid control valve, the diaphragm member is provided between the actuator and the valve body, and the diaphragm member has a protruding part protruding toward the valve body. In addition, a sphere that receives the pressing force of the actuator is provided inside the protruding part. Then, the actuator moves the valve body by pressing the protruding part through the sphere.

PRIOR ART DOCUMENT

Patent Document

Patent Document 1: JP 6141663 B2

SUMMARY OF THE INVENTION

Incidentally, both the diaphragm member and the sphere of the conventional art are formed of metal such as stainless steel, and a fluorine coating is applied to the surface of the sphere in order to reduce friction between the diaphragm member and the sphere and to prolong the life of the diaphragm member and the sphere.

However, when the fluid control valve is driven, fretting wear or the like occurs, the fluorine coating is peeled off, and contact between pieces of stainless steel metal having a high friction coefficient is repeated. As a result, the diaphragm member is broken, which hinders the prolongation of the life of the fluid control valve. Note that, although it is conceivable to apply a coating having high hardness to the sphere, the fluid control valve becomes expensive and is not practical.

Therefore, the present invention has been made to solve the above-described problems, and it is an object of the present invention to prolong the life of a fluid control valve while keeping an inexpensive configuration of the fluid control valve.

That is, a fluid control valve according to the present invention includes a valve body that can come into contact and separate from a valve seat; an actuator that causes the valve body to move; a diaphragm member provided between the valve body and the actuator and having a protruding part protruding toward the valve body; and a sphere housed inside the protruding part, in which the actuator moves the valve body by pressing a distal end of the protruding part through the sphere, and the sphere is formed of a ceramic material.

With such a fluid control valve, because the sphere housed in the protruding part of the diaphragm member is formed of a ceramic material, the life of the fluid control valve can be prolonged as compared with the case of using a sphere made of metal such as stainless steel. In addition, because the ceramic material has a friction coefficient smaller than that of metal such as stainless steel, coating such as a fluorine coating does not need to be applied as in the conventional case, and the fluid control valve can have an inexpensive configuration.

As a specific embodiment of the sphere, the sphere is desirably formed of alumina.

In order to prolong the life by preventing breakage of the protruding part, the protruding part desirably have a wall thickness of 100 to 130 μm in the diaphragm member.

As a specific embodiment of the diaphragm member, the diaphragm member has a flange part expanding outward with respect to the protruding part from a base end of the protruding part, and the flange part has a wall thickness of 100 to 130 μm.

As a specific embodiment of the diaphragm member and the protruding part, the diaphragm member is desirably constituted of a metal sheet, and the protruding part is formed by plastically deforming the metal sheet by drawing.

In order to make the sphere inexpensive, it is desirable that the sphere is not subjected to surface coating.

Furthermore, a fluid control device according to the present invention includes the fluid control valve described above, a fluid sensor that measures fluid flowing through a flow path, and a valve control unit that controls the fluid control valve on the basis of a measurement value of the fluid sensor.

As described above, according to the present invention, the life of a fluid control valve can be prolonged while keeping an inexpensive configuration of the fluid control valve.

DETAILED DESCRIPTION

Figure 1:
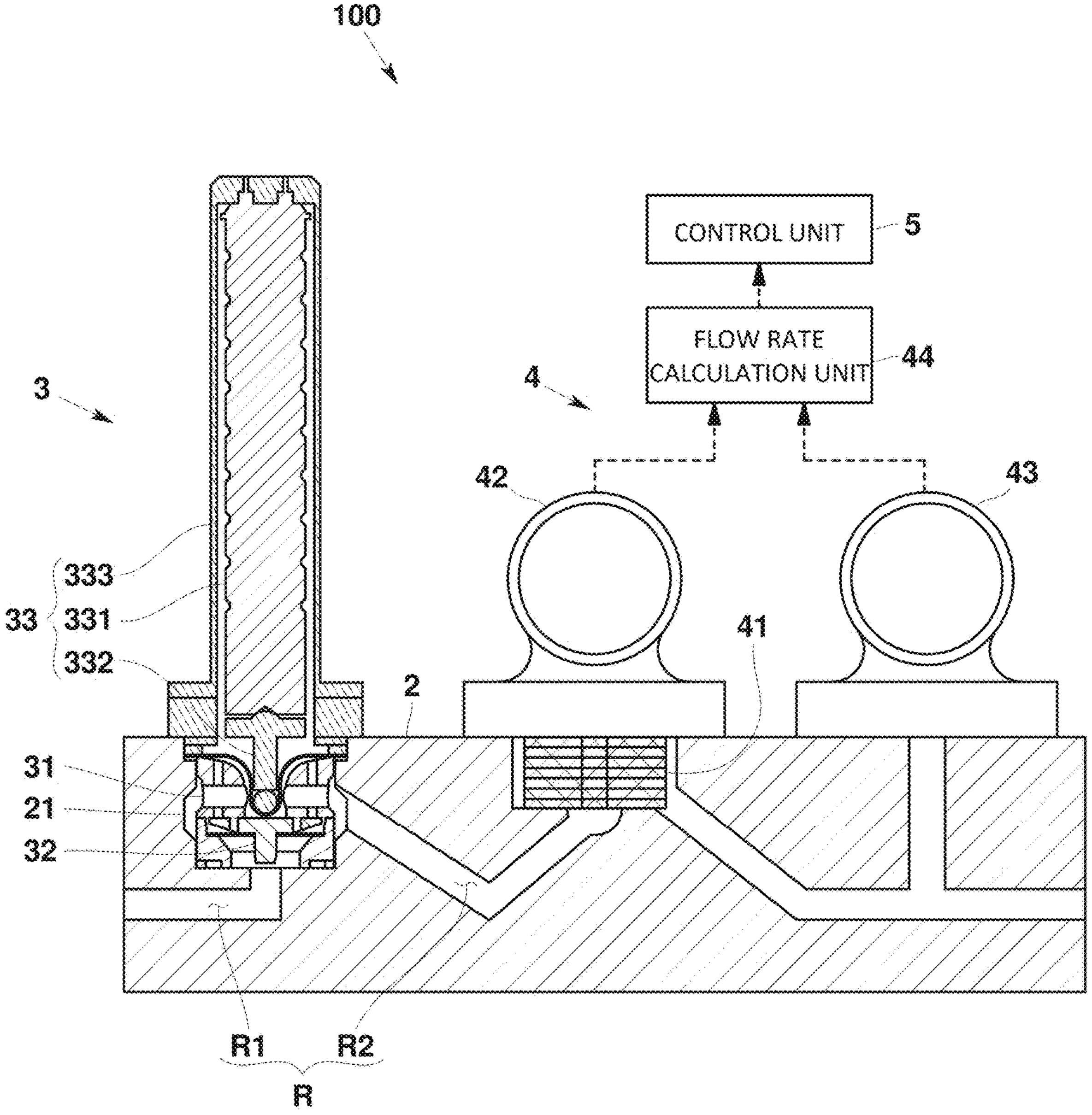
FIG. 1 is a diagram schematically illustrating a configuration of a fluid control device according to an embodiment of the present invention.

Hereinafter, a fluid control device according to an embodiment of the present invention will be described with reference to the drawings. Note that any of the drawings illustrated below is schematically drawn while being omitted or exaggerated as appropriate for easy understanding. The same components are denoted by the same reference numerals, and the description thereof will be omitted as appropriate.

Device Configuration

The fluid control device 100 of the present embodiment is a so-called mass flow controller, and is used, for example, to control the flow rate of gas supplied to a chamber in which a semiconductor manufacturing process is performed. The fluid control device 100 may control not only gas but also liquid.

Specifically, as illustrated in FIG. 1, the fluid control device 100 includes a flow path block 2 in which a flow path R is formed, a fluid control valve 3 for controlling gas in the flow path R, a fluid sensor 4 for measuring a flow rate of the flow path R, and a control unit 5 for controlling the fluid control valve 3 on the basis of a measurement value measured by the fluid sensor 4.

The flow path block 2 is formed with a housing recess 21 to which the fluid control valve 3 is attached. This housing recess 21 is formed on one surface (upper surface in FIG. 1) of the flow path block 2. In addition, an upstream flow path R1 is connected to the bottom surface of the housing recess 21, and a downstream flow path R2 is connected to the inner peripheral surface of the housing recess 21. That is, the flow path R formed in the flow path block 2 is divided into the upstream flow path R1 and the downstream flow path R2 by the housing recess 21.

Note that a gas introduction port (not illustrated) is provided at an upstream end of the upstream flow path R1, and a gas lead-out port (not illustrated) is provided at a downstream end of the downstream flow path R2.

The fluid control valve 3 is a so-called normally closed piezo value and an opening degree thereof is controlled by an applied voltage. Note that the fluid control valve 3 may be a so-called normally open valve.

Figure 2:
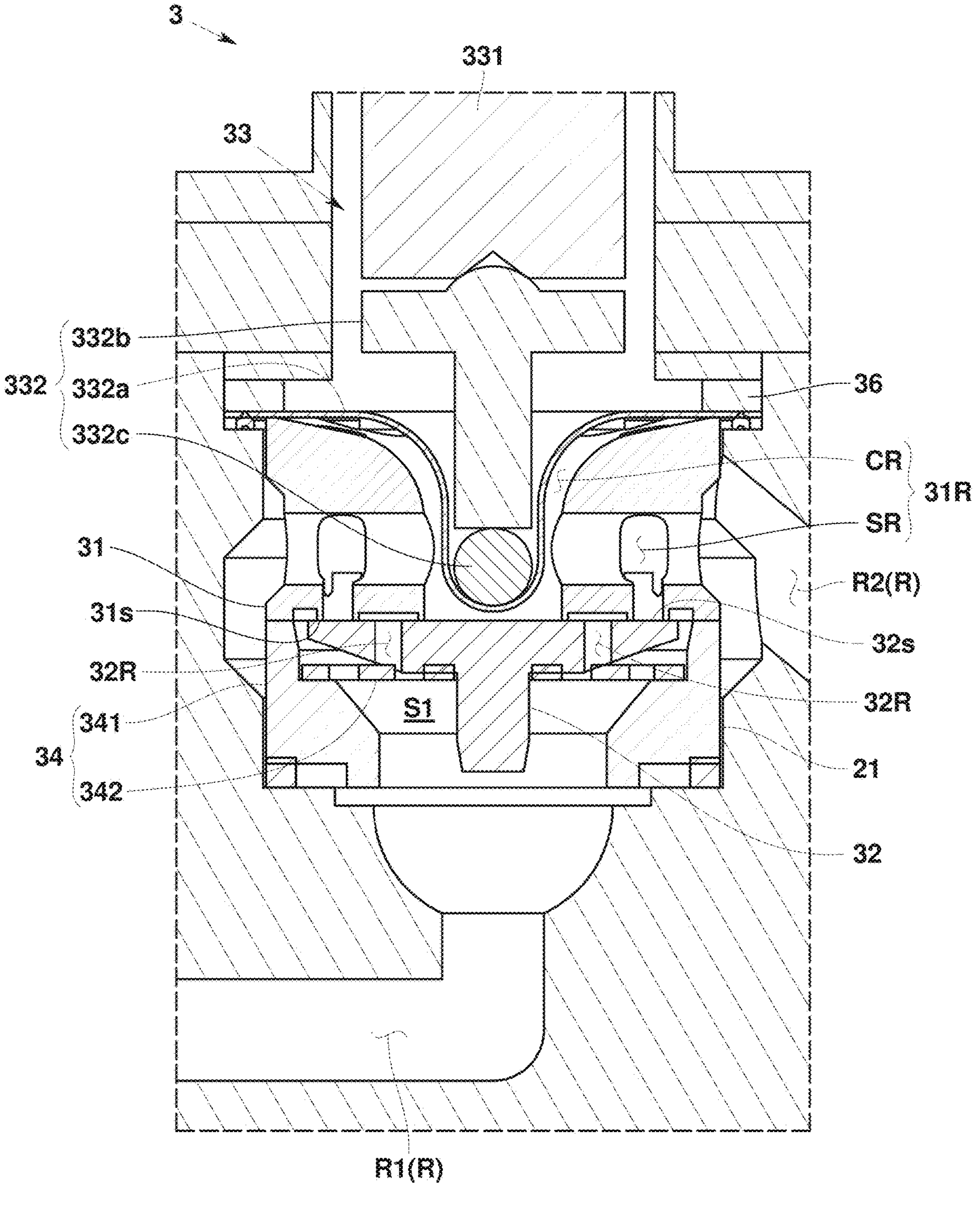
FIG. 2 is a partially enlarged cross-sectional view illustrating an orifice and a valve body of the fluid control valve of the above embodiment.

Specifically, as illustrated in FIGS. 1 and 2, the fluid control valve 3 includes an orifice (valve seat member) 31 having a valve seat surface 31*s*, a valve body 32 having a seating surface 32*s* seated on the valve seat surface 31*s*, and a drive part 33 that drives the valve body 32.

The orifice 31 is housed in the housing recess 21. Here, the orifice 31 is housed in the housing recess 21 such that the valve seat surface 31*s* faces the bottom surface of the housing recess 21. In the orifice 31, an inflow port is formed in the valve seat surface 31*s*, and an internal flow path 31R communicating with the inflow port is formed. Specifically, the orifice 31 has a substantially disk shape, and includes, as the internal flow path 31R, a central flow path part CR formed in a central part and a surrounding flow path part SR provided around the central flow path part CR. Note that the central flow path part CR is a flow path through which a plunger mechanism 332 constituting the drive part 33 to be described later is inserted.

The valve body 32 is provided movably inside the housing recess 21. This valve body 32 is provided in the housing recess 21 between the valve seat surface 31*s* of the orifice 31 and the bottom surface of the housing recess 21.

Specifically, the valve body 32 has the seating surface 32*s* on the upper surface, and the seating surface 32*s* is formed with an outflow port and also formed with the internal flow path 32R communicating with the outflow port. Note that the outflow port of the seating surface 32*s* and the inflow port of the valve seat surface 31*s* are formed at positions not overlapping each other in a state where the seating surface 32*s* is seated on the valve seat surface 31*s*.

Further, the valve body 32 is movably supported by a support member 34 inside the housing recess 21. This support member 34 includes an annular support base 341 housed in the housing recess 21, and an elastic body 342 such as a leaf spring provided inside the support base 341 and supporting the valve body 32. With this configuration, the valve body 32 is supported inside the support base 341 by the elastic body 342. Note that both the support base 341 and the elastic body 342 are configured to allow gas to flow. In addition, the lower surface of the orifice 31 is in close contact with the annular upper surface of the support base 341 to form a valve chamber S1 that houses the valve body 32 and communicates with the upstream flow path R1.

The drive part 33 includes, for example, a piezo stack 331 that is an actuator formed by stacking a plurality of piezo elements, and the plunger mechanism 332 that is displaced by extension of the piezo stack 331.

The piezo stack 331 is housed in a casing 333, and the distal end of the piezo stack 331 is connected to the plunger mechanism 332. The plunger mechanism 332 of the present embodiment includes a diaphragm member 332*a* and a pressing member 332*b* that presses the upper surface of the valve body 32 through the diaphragm member 332*a*. This plunger mechanism 332 is inserted into the central flow path part CR of the orifice 31 and comes into contact with the upper surface of the valve body 32.

The diaphragm member 332*a* is provided between the valve body 32 and the piezo stack 331, and is constituted of, for example, a metal sheet of such as stainless steel or aluminum. The diaphragm member 332*a* partitions inside the housing recess 21 into a flow path space in which the orifice 31 and the valve body 32 are provided and an external space in which the piezo stack 331 is provided, and transmits the pressing force from the piezo stack 331 to the valve body 32.

Figure 3:
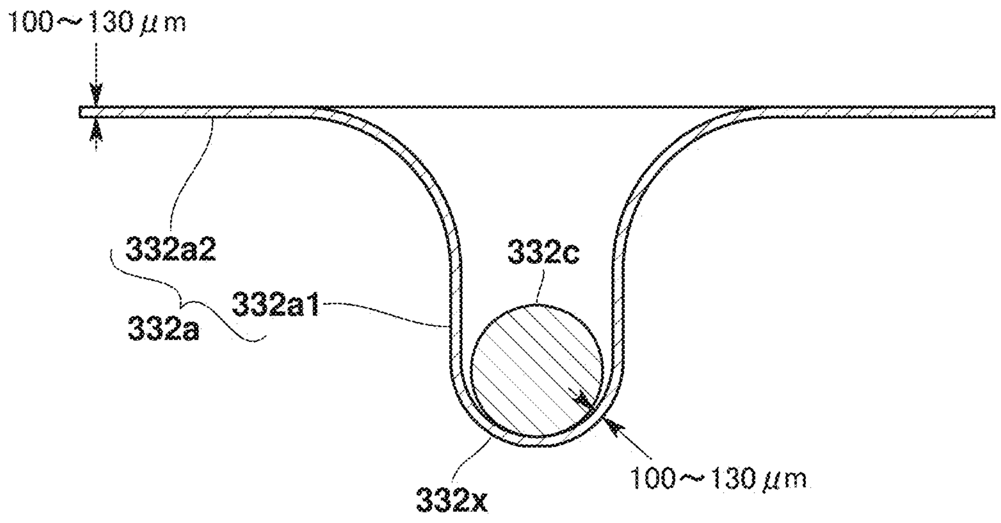
FIG. 3 is a cross-sectional view illustrating details of a diaphragm member of the above embodiment.

Specifically, as illustrated in FIG. 3, the diaphragm member 332*a* has a protruding part 332*a*1 protruding toward the valve body 32 and a flange part 332*a*2 continuous with the base end of the protruding part 332*a*1. The protruding part 332*a*1 is a portion of the diaphragm member 332*a* protruding from a flat plate part (here, the flange part 332*a*2) toward the valve body 32. A distal end 332*x* of the protruding part 332*a*1 has a hemispherical shape, and a tip thereof presses the valve body 32. Further, the flange part 332*a*2 has an annular shape in plan view, and a peripheral edge part thereof is fixed to the housing recess 21 by a fixing part 36.

Here, in the diaphragm member 332*a*, the protruding part 332*a*1 is formed by plastically deforming a metal sheet by drawing. This protruding part 332*a*1 may be formed by deep drawing in which the depth becomes larger than the inner diameter, or may be formed by shallow drawing in which the inner diameter becomes larger than the depth. In addition, the wall thickness of the metal sheet constituting the diaphragm member 332*a* is 100 to 130 μm, the wall thickness of the protruding part 332*a*1 obtained by drawing the metal sheet is 100 to 130 μm, and the wall thickness of the flange part 332*a*2 is 100 to 130 μm.

Furthermore, the drive part 33 is provided with, between the diaphragm member 332*a* and the pressing member 332*b*, a sphere 332*c* that transmits the pressing force from the pressing member 332*b* to the diaphragm member 332*a*. This sphere 332*c* is housed in the protruding part 332*a*1 of the diaphragm member 332*a*. That is, the diameter of the sphere 332*c* is slightly smaller than the inner diameter of the protruding part 332*a*1.

The sphere 332*c* is formed of a ceramic material having a friction coefficient smaller than that of stainless steel. Note that a friction coefficient of stainless steel is 0.5. The sphere 332*c* of the present embodiment is made of alumina ($Al_2O_3$) among ceramic materials. Note that a friction coefficient of alumina is 0.1. Here, the surface of the sphere 332*c* is not subjected to coating.

When a predetermined voltage is applied to the piezo stack 331, the piezo stack 331 extends, and the pressing member 332*b* presses the distal end 332*x* of the protruding part 332*a*1 of the diaphragm member 332*a* through the sphere 332*c* to bias the valve body 32 in the valve opening direction. Here, the valve seat surface 31*s* is separated from the seating surface 32*s* by a distance corresponding to the applied voltage to cause the surfaces to be in the open state. Then, the upstream flow path R1 and the downstream flow path R2 communicate with each other through this gap. On the other hand, in the normal state where no voltage is applied to the piezo stack 331, the valve body 32 is in the closed state by the elastic force of the elastic body 342 of the support member 34.

The fluid sensor 4 is of a pressure type, and includes a laminar flow element 41 provided in the flow path R, a first pressure sensor 42 provided to enable measurement of the pressure on the upstream side of the laminar flow element 41, a second pressure sensor 43 provided to enable measurement of the pressure on the downstream side of the laminar flow element 41, and a flow rate calculation unit 44 that calculates the flow rate of the fluid flowing through the flow path R on the basis of a first pressure and a second pressure measured by the first pressure sensor 42 and the second pressure sensor 43. This fluid sensor 4 is provided on the upstream side or the downstream side of the fluid control valve 3 in the flow path R. Note that, a sonic nozzle or the like may be used instead of the laminar flow element to be provided as a fluid resistance 41.

The control unit 5 controls the fluid control valve 3 on the basis of a measured flow rate measured by the fluid sensor 4. This control unit 5 is a computer including a central processing unit (CPU), a memory, an analog-to-digital (A/D) converter, a digital-to-analog (D/A) converter, and various input/output units, and controls the fluid control valve 3 by executing a fluid control program stored in the memory and cooperating with the CPU and peripheral devices.

The control unit 5 controls the opening degree of the fluid control valve 3 on the basis of a command flow rate input from the outside and the measured flow rate measured by the fluid sensor 4. Specifically, the control unit 5 controls the opening degree of the fluid control valve 3 to cause the deviation between the command flow rate and the measured flow rate to become small. The control unit 5 of the present embodiment performs proportional, integral, and derivative (PID) calculation on the deviation between the command flow rate and the measured flow rate, and outputs a command voltage corresponding to a result of the calculation to a drive circuit of the drive part 33. The drive circuit applies a voltage corresponding to the input command voltage to the piezo stack 331.

Cycle Life Test

Figure 4:
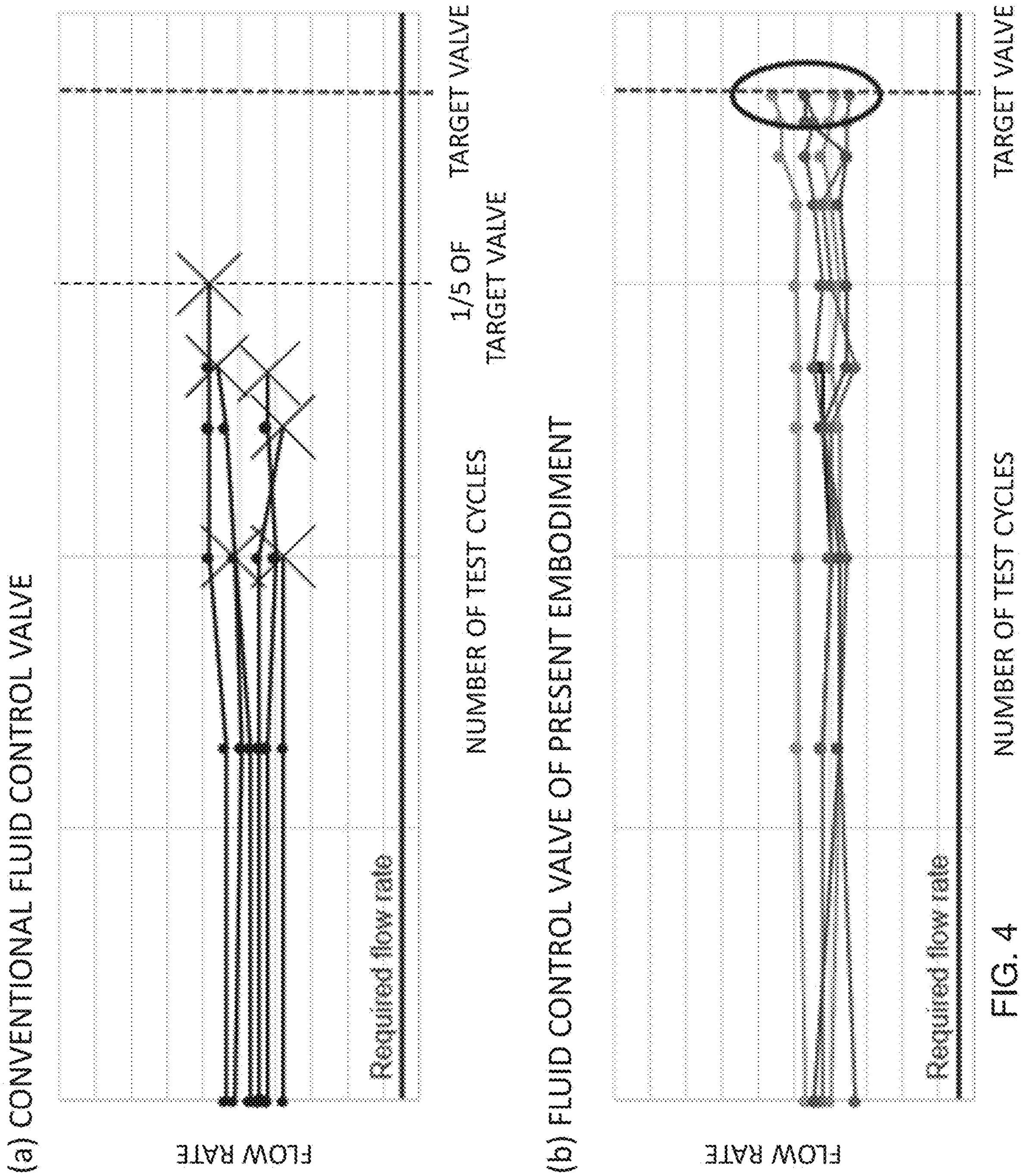
FIG. 4 shows results of a cycle life test of a conventional fluid control valve and a fluid control valve of the present embodiment.

Next, the result of a cycle life test of the conventional fluid control valve and the result of the cycle life test of the fluid control valve of the present embodiment are illustrated in FIG. 4. Note that, in the conventional fluid control valve, the diaphragm member and the sphere are made of stainless steel, and the surface of the sphere is coated with fluorine. Further, in the fluid control valve of the present embodiment, the diaphragm member is formed of stainless steel, the sphere is formed of alumina, and the surface of the sphere is not subjected to coating.

As can be seen from FIG. 4(*a*), in the conventional fluid control valve, in all of the tested valves, the diaphragm members were broken until a point before the number of driving times reaches a fifth of the target value. Note that, in FIG. 4(*a*), the broken point is indicated by a cross (x). Here, by analyzing the sphere of the fluid control valve in which the diaphragm member was broken with an X-ray analyzer or the like, it was confirmed that the fluorine coating of the sphere was peeled off, and fretting wear or the like was occurring. On the other hand, as can be seen from FIG. 4(*b*), in the fluid control valve of the present embodiment, in all the tested valves, the diaphragm members were not cracked (broken) even after the valves were driven for the number of driving times over the target value. In addition, in any of the valves, a fluid can be flowed at a flow rate exceeding the required flow rate.

Effect of Present Embodiment

As described above, with the fluid control device 100 in the present embodiment, because the sphere 332*c* housed in the protruding part 332*a*1 of the diaphragm member 332*a* is formed of a ceramic material, the life of the fluid control valve 3 can be prolonged as compared with the case of using a sphere made of stainless steel. In addition, because the ceramic material has a friction coefficient smaller than that of stainless steel, coating such as a fluorine coating does not need to be applied as in the conventional case, and the fluid control valve 3 can have an inexpensive configuration.

Other Embodiments

For example, in the above embodiment, the sphere 332*c* is formed of alumina, but other ceramic materials (a sintered body obtained by heating and hardening an inorganic substance) may be used. In this case, the sphere 332*c* may be formed of, for example, an oxide-based ceramic material such as zirconia or barium titanate, a hydroxide-based ceramic material such as hydroxyapatite, a carbide-based ceramic material such as silicon carbide, a carbonate-based ceramic material, a nitride-based ceramic material such as silicon nitride, a halide-based ceramic material such as fluorite, or a phosphate-based ceramic material.

Furthermore, in the above embodiment, the whole sphere 332*c* is formed of a ceramic material, but an outer shell portion forming the surface of the sphere 332*c* may be formed of a ceramic material.

Figure 5:
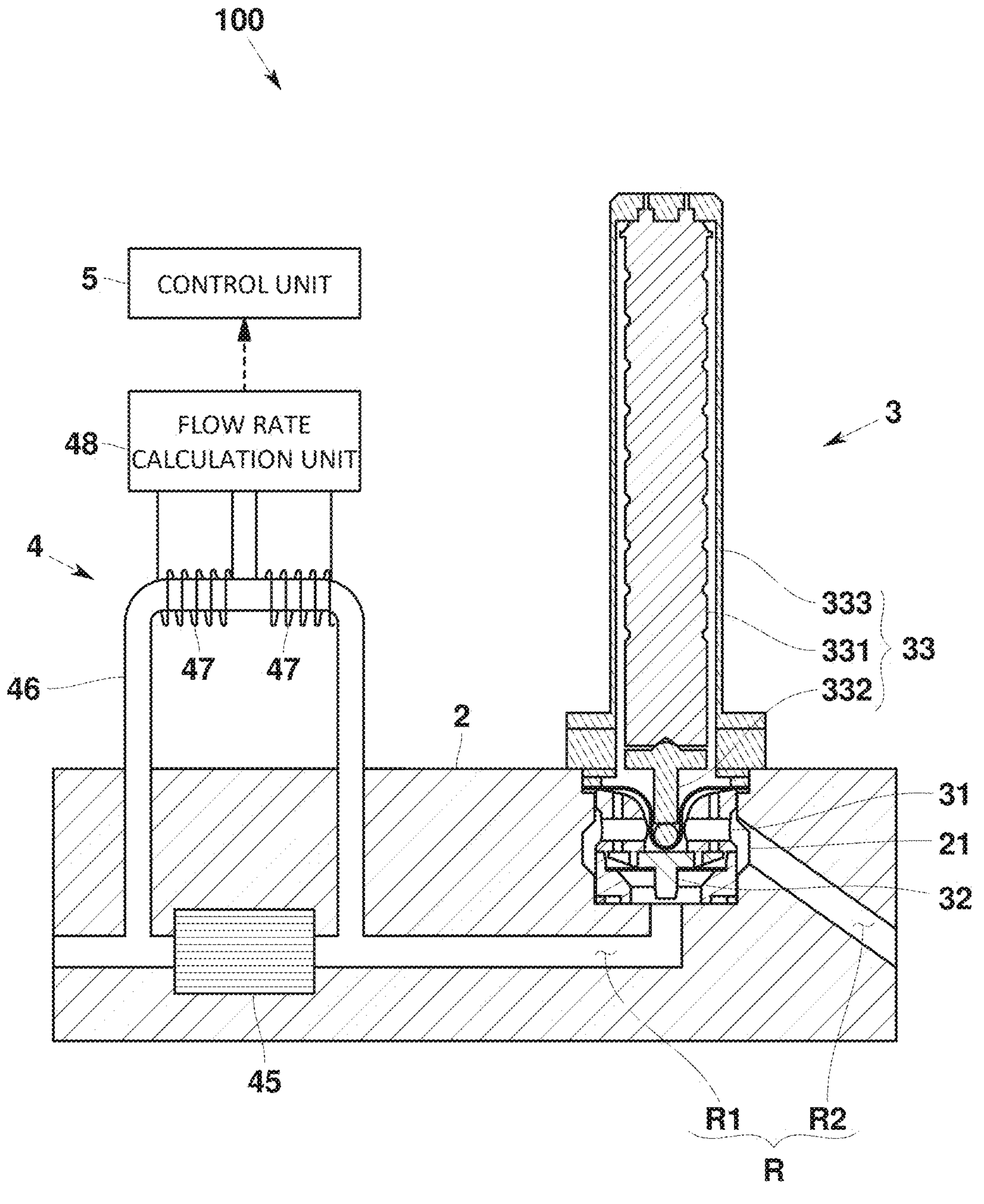
FIG. 5 is a diagram schematically illustrating a configuration of a fluid control device according to a modified embodiment.

The fluid sensor 4 of the above embodiment is of a pressure type, but may be of a thermal type. Specifically, as illustrated in FIG. 5, a thermal fluid sensor 4 includes a shunt element (resistance element) 45 provided in a flow path R, a narrow tube 46 that branches from the upstream side of the shunt element 45 and joins the downstream side of the shunt element 45, two electric heating coils 47 that are wound around the narrow tube 46 and to which voltages are applied to cause the coils to be kept at constant temperatures, and a flow rate calculation unit 48 that detects a difference in voltage applied to each of the electric heating coils 47 to calculate a flow rate of gas flowing through the flow path R. This fluid sensor 4 is provided on the upstream side or the downstream side of a fluid control valve 3 in the flow path R. Note that the flow rate measurement principle in the fluid sensor is not limited to the above, and any method may be used.

Furthermore, although the actuator of the above embodiment is a piezo stack, for example, a solenoid or the like may be used.

In addition, various modifications or combination of the embodiments may be made without departing from the spirit of the present invention.

100 fluid control device
3 fluid control valve
4 fluid sensor
5 valve control unit
31*s* valve seat surface (valve seat)
32 valve body
331 piezo stack (actuator)
332*a* diaphragm member
332*a*1 protruding part
332*a*2 flange part
332*c* sphere

What is claimed is:

1. A fluid control valve comprising:
a valve body that can come into contact and separate from a valve seat;
an actuator that causes the valve body to move;
a diaphragm member provided between the valve body and the actuator and having a protruding part protruding toward the valve body; and
a sphere housed inside the protruding part,
wherein
the actuator moves the valve body by pressing a distal end of the protruding part through the sphere,
the sphere is formed of a ceramic material,
the sphere is formed of alumina,
in the diaphragm member, the protruding part has a wall thickness of 100 to 130 μm, and
the sphere is not subjected to surface coating.

2. The fluid control valve according to claim 1, wherein
the diaphragm member has a flange part expanding outward with respect to the protruding part from a base end of the protruding part, and
the flange part has a wall thickness of 100 to 130 μm.

3. The fluid control valve according to claim 1, wherein
the diaphragm member is constituted of a metal sheet, and
the protruding part is formed by plastically deforming the metal sheet by drawing.

4. A fluid control device comprising:
the fluid control valve according to claim 1;
a fluid sensor that measures fluid flowing through a flow path; and
a valve control unit that controls the fluid control valve on a basis of a measurement value of the fluid sensor.

5. The fluid control valve according to claim 1, wherein the fluid control valve includes an orifice having a valve seat surface, the valve body includes a seating surface seated on the valve seat surface, and an outflow port of the seating surface and an inflow port of the valve seat surface are formed at positions not overlapping each other.

* * * * *